(12) United States Patent
Nash

(10) Patent No.: US 11,324,351 B1
(45) Date of Patent: May 10, 2022

(54) MEMORABILIA TOOL STAND

(71) Applicant: Franklin DeLano Nash, Eatonton, GA (US)

(72) Inventor: Franklin DeLano Nash, Eatonton, GA (US)

( * ) Notice: Subject to any disclaimer, the term of this patent is extended or adjusted under 35 U.S.C. 154(b) by 0 days.

(21) Appl. No.: 16/998,677

(22) Filed: Aug. 20, 2020

Related U.S. Application Data

(60) Provisional application No. 62/889,374, filed on Aug. 20, 2019.

(51) Int. Cl.
*A47G 33/00* (2006.01)
*F16M 13/02* (2006.01)
*F16B 1/00* (2006.01)

(52) U.S. Cl.
CPC .............. *A47G 33/004* (2013.01); *F16B 1/00* (2013.01); *F16M 13/022* (2013.01); *F16B 2001/0028* (2013.01); *F16B 2001/0035* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,572,454 A | * | 10/1951 | Down ...................... | A47G 1/14 40/506 |
| 3,508,732 A | * | 4/1970 | Trachtenberg .......... | A47J 45/02 248/231.71 |
| 3,559,935 A | * | 2/1971 | Gardner .................... | A47G 1/12 248/125.8 |
| 3,801,055 A | * | 4/1974 | Stenger ................... | E05B 73/00 248/176.1 |
| 3,955,786 A | | 5/1976 | Duddy | |
| 4,938,695 A | * | 7/1990 | Kinner .................... | G09B 27/08 368/23 |
| 5,288,557 A | | 2/1994 | Perlmann | |
| 5,779,294 A | * | 7/1998 | Magri ..................... | G09B 23/36 248/496 |
| 6,029,826 A | * | 2/2000 | Clay ..................... | A47G 33/004 206/315.9 |
| 6,106,912 A | | 8/2000 | Balog | |

(Continued)

*Primary Examiner* — Monica E Millner
(74) *Attorney, Agent, or Firm* — Oliver Edwards; Law Office of Oliver Edwards LLC

(57) ABSTRACT

The present invention pertains to a Magnetized Multiple Media Memorabilia/Tool Stand apparatus assembly device mechanism, aimed particularly at enabling an end user to have object(s) securely, safely, easily, quickly and in a cost effective method and it/they are mounted/attached in/on a singularly base and be used in multiple locations. This "Magnetized Memorabilia Media Stand", allows an item(s) including but not limited to work, employment, sports, etc., or the like to be usable as well as displayed. Said can be hung on a Wall-Post, Garage-Refrigerator-House Door, Window Seal, be a Desk Paper Weight, PencilPen-Clip Holder, on Mailboxes, etc. Said has multiple purposes and be used in multiple locations. As "Helmet Hoodie Stand", it doesn't have multiple magnets nor bolted to a Vehicle, for effectiveness as described herein. Said configuration allows it to be superior to prior art, because its shaft/rod/brace/bracket/magnet mechanism embodiments, etc., are not exclusively for a hood purpose.

19 Claims, 5 Drawing Sheets

(56) References Cited

U.S. PATENT DOCUMENTS

| | | | | |
|---|---|---|---|---|
| 6,199,804 | B1* | 3/2001 | Donofrio, Jr. | A47F 7/0028 248/121 |
| 8,627,952 | B2* | 1/2014 | Glinert | A63B 47/00 206/315.9 |
| 9,108,117 | B2* | 8/2015 | Rinehart | A63H 3/50 |
| 9,119,485 | B1* | 9/2015 | DeLoach, Jr. | A47F 7/00 |
| 9,719,631 | B1* | 8/2017 | DeLoach, Jr. | A42B 3/006 |
| 2001/0000553 | A1* | 5/2001 | Donofrio, Jr. | A47G 33/004 40/800 |
| 2003/0116688 | A1* | 6/2003 | Furukawa | A47F 5/0892 248/339 |
| 2010/0310794 | A1 | 12/2010 | Nordvik | |
| 2011/0179901 | A1* | 7/2011 | Kladde | A63H 3/36 74/557 |
| 2013/0189456 | A1 | 7/2013 | Verbeyst-Hayes | |
| 2014/0158841 | A1* | 6/2014 | Mooney | A47F 7/06 248/158 |
| 2016/0053938 | A1* | 2/2016 | Snustead | A47G 25/10 248/206.2 |
| 2016/0143455 | A1* | 5/2016 | Wolk | A47F 7/06 248/157 |
| 2018/0163915 | A1* | 6/2018 | Halper et al. | F16M 11/22 |

* cited by examiner

US 11,324,351 B1

MEMORABILIA TOOL STAND

BACKGROUND

Unlike known prior art of this nature, which has a threaded bolt/rod through a hood and into a hood ornament base for secure mounting purposes on a hood or known prior art which has a magnetic system (requiring multiple magnets/top and bottom surface magnet), that have the capability of displaying a single item, they are not capable of having the capacity of present invention and its multiple functions. The present invention herein, is a Magnetized Multiple Media Memorabilia/Tool Stand apparatus device/mechanism, that's capable of accommodating Tools, Memorabilia, etc., which allows/provides for personal item(s) to be secured and in known manner(s) and can be are/is singularly mounted on/to a single shaft/bolt/rod threaded or not. Additionally, its geometric shaped stabilization brace/bracket aperture bar which is the mounting embodiment, its fastener system embodiments(nuts/washer/sealant/abrasion protector material, etc.), its magnet and its cover is in a manner where its brace/bracket apertures bar embodiment, provides end use for stabilization, mounting memorabilia, insert-ability of objects as well as for aerodynamics and strength purposes.

Additionally, prior art of this nature is to/for Vehicle Hood/Body mounting and not for the concept of present invention. Present invention is designed to display end user's item(s), be it vertically/horizontal/or mounted upside down/as well as in multiple direction(s), whether on the Interior/Exterior of a Wall, be on a Mailbox side (Aluminum/Steel/Iron/Plastic, etc.), Garage-Refrigerator-Home Door (mounted like a decorative wreath), etc., and on metal/non metallic surfaces with its embodiments.

DESCRIPTION OF THE RELATED ART

U.S. Pat. No. 5,288,557 issued to Richard I. Perlman/Marvin K. Perlman on Feb. 22, 1994 is a which is a Portable hood ornament structure, which is different from present invention in design, purpose and capabilities and said is exclusively for a hood of a vehicle and is not designed or configured to be hung from a wall, etc., as can be done with present invention.

U.S. Patent Application Publication 2013/0189456, by Beth Ann Verbeyst-Hayes on Jul. 25, 2013, is a Magnetic Hood Ornament, which is different from present invention, in that is limited to a vehicle hood and has multiple magnets for stability unlike present invention and said is not designed or configured to be hung from a wall, etc., as can be done with present invention.

U.S. Pat. No. 3,955,786 issued to James J. Duddy on May 11, 1976, is a Miniature magnetic base flagstaff assembly for vehicles bodies and its flagstaff is designed to be flexible, which is different from present invention which it is not.

U.S. Pat. No. 6,106,912 issued to Leonard John Balog on Aug. 8, 2000, is a Emblem mounting assembly, which has an elastic base which is different from present invention which has a single magnetic base with its vertical shaft/rod, etc., that's perpendicular to its magnet base assembly.

U.S. Patent Application Publication 2010/0310794 by Alte B. Nordvik, George I. Berliner, Lene Marie Nordvik on Dec. 9, 2010, which is a Decorative Removable Ornaments with Permanently Installed Magnets and said invention has a preferred embodiment of foam body that contains a magnet surrounded by a mesh cloth, which is different from present invention.

SUMMARY OF INVENTION

In an exemplary embodiment of the present invention, there is provided a Magnetized Multiple Media Memorabilia/Tool Stand apparatus, that is attachably detachable to surfaces and configured geometrically for attaching/detaching one or more embodiments on/in it and said has an upright vertical direction rod/post/shaft type embodiment member and said member has known capabilities of being stationary and said has a base embodiment member that is perpendicular to it and said base is magnetized with a cover where the base and its cover has an aperture so as to allow its upright embodiment member to pass through it, be secured to it in a known manner and methods and said upright embodiment has a geometric stabilization bar shape embodiment(s) material which has apertures that allows the vertical embodiment member to be attached to it and to formed and create that which is referred to as its brace/bracket stabilization bar embodiment member that/which allows an embodiment(s) to be mounted/attached to it as well be an implement holder and provide suspension/stability aspects when all embodiments are joined/connecting together forming a single magnetized embodiment unit unitarily.

In some embodiments, the vertical rod/post/shaft type embodiment member(s), its geometric shape brace/bracket with apertures embodiment member(s), its magnet and its magnet cover which has apertures, are joined together with/through their apertures embodiments by way of its said pass-through vertical rod/post/shaft type embodiment member(s).

In some embodiments, nuts, washers, bolts, screws, adhesive material to join/combine/protect said embodiments when organized together for unit stability.

In some embodiments, the vertical rod/post/shaft type member item has two opposite ends at which one said opposite end of ends has capabilities of accepting embodiment items connect ability for stabilization purposes as/of a unit.

In some embodiments, there is a protective layered non-abrasive material on the magnet base to assist in scratch damage control when placed on desired locations.

In some embodiments, the magnet base has a corresponding metallic plate for adhering adhesive hook and loop embodiments to non-metallic surfaces.

In some embodiments, the geometric brace/bracket bar type has apertures for aerodynamics purposes, stabilization, mounting, display aspects as well as tool functionality usage.

In some embodiments, the geometric brace/bracket bar has apertures to allow an exposed lower outward end aperture(s) the capabilities of the unit being suspended/hung by or accepting its "T" bar implement embodiment or is curved in a skyward upward direction perpendicular to its base magnet for such acceptance/purposes.

In some embodiments, there is a unitary body in which the vertical threaded rod/shaft or the like that's perpendicular to its base magnet/magnet cover, its geometric shaped bar with apertures, its nuts/washers/bolts-adhesive material, its corresponding metal magnet plate with its hook and loop embodiments are combined with end users choice of Memorabilia item(s).

In some embodiments, the assembly has a brace bracket bar with apertures for stability, aerodynamics, mounting memorabilia item(s), tool insertion, mounting stand on multiple surfaces and at multiple angled positions as well the attachment of its display "T" bar embodiment where one or more name plates and or artwork(s) can be positioned.

In some embodiments, the assembly has a magnet, the magnet has a cover and both have an aperture and are horizontal, whereas its rod/shaft that passes through the apertures in a vertical manner of ninety degrees/thus being vertical to them and through its geometric shape bar bracket brace and its memorabilia item(s) and are secured to one another with known nuts/washer/adhesive material to serve as a fasteners system for the unitary unit.

In some embodiments, the assembly magnet and its magnet cover base unit has a smooth protective layer shield on its base that is adhesively attached thereto for surface protection.

In some embodiments, the assembly unit has an attachable/detachable magnet unit corresponding metal plate embodiment that adheres to its magnet embodiment when end user desires and the corresponding metal plate has an adhesive hook/loop material combination pad embodiments which is capable of adhering to ferrous/non-ferrous material.

In some embodiments, the apparatus has at least 95 pounds(lbs.) of pull.

In some embodiments, the assembly threaded rod/bolt/shaft Head End is at the top of the Memorabilia item(s) and the un-headed end with threads, are passed through the top of the memorabilia artwork item then through the top upper section of the geometric shaped bar brace bracket aperture, then a known fastener set (washer/nut) is applied and tighten upward (turned right to left) toward rod/bolt head against the upper section of the geometric shaped bar brace bracket aperture and Memorabilia helmet inner side, then a fastener set (nut/washer) is applied to its bolt, which is to be tighten downward against the stabilizing geometric shaped bar brace bracket aperture at the appropriate procedure time and then again the same rod/bolt/shaft passes through the lower section of stabilizing geometric shaped bar brace bracket aperture and then said geometric shaped bar brace bracket is placed on the top of magnet cover then said threaded rod/bolt/shaft passes through magnet cover aperture, then through the magnet aperture then, the same threaded rod/bolt/shaft passes through the magnet where there it is designed to be a recessed space in magnet unit for a fastener nut set (washer if used), to be applied recessively so that Magnetized Multiple Media Memorabilia/Tool Stand apparatus mechanism assembly device becomes a unitary unit.

In some embodiments, the Magnetized Multiple Media Memorabilia/Tool Stand apparatus can have more than one element of expression and/or artwork affixed thereto and on it unitarily and simultaneously.

In some embodiments, the Magnetized Multiple Media Memorabilia/Tool Stand apparatus has an bolt/rod embodiment that is vertical to its horizontal magnetic embodiment, its base, and its vertical embodiment can pass through Memorabilia item(s) such as the "Helmet Hoodie", as well as its magnet unit as herein described and illustrated, as well as have other said item(s) attached simultaneously to it when and while it is attached to its base.

In some embodiments, the Magnetized Multiple Media Memorabilia/Tool Stand apparatus can accommodate one or more memorabilia such as thermos/water bottles, cups, baseball caps, and trophies, through same mounting principles and process used with the Helmet Hoodie.

In some embodiments, the Magnetized Multiple Media Memorabilia/Tool Stand apparatus "T" Bar embodiment has bolts, nuts, washer sets for accessory attachment to attach it to its geometric shape stabilization brace bracket bar with apertures.

BRIEF DESCRIPTION OF THE DRAWINGS

The present invention herein described and illustrated, is designed and created to provide the end user(s) the opportunity to highlight their personal emotional and affects unit item(s)/(one or more), in a safe, practical and cost effective method and manner in multiple desired locations and positions. Present invention is constructed of known materials in/of specific geometric shape(s), so as to accommodate one or more embodiment item(s), simultaneously through its concept, mechanisms, etc., thus increasing the uses of present invention in several means and methods over prior art, which will be obviously apparent through illustration and descriptions as stated herein as in.

FIG. 5 is a top side angle view of present invention, featuring it on a known type of Refrigerator/Freezer Door or the like.

DETAILED DESCRIPTION

Figure 1:
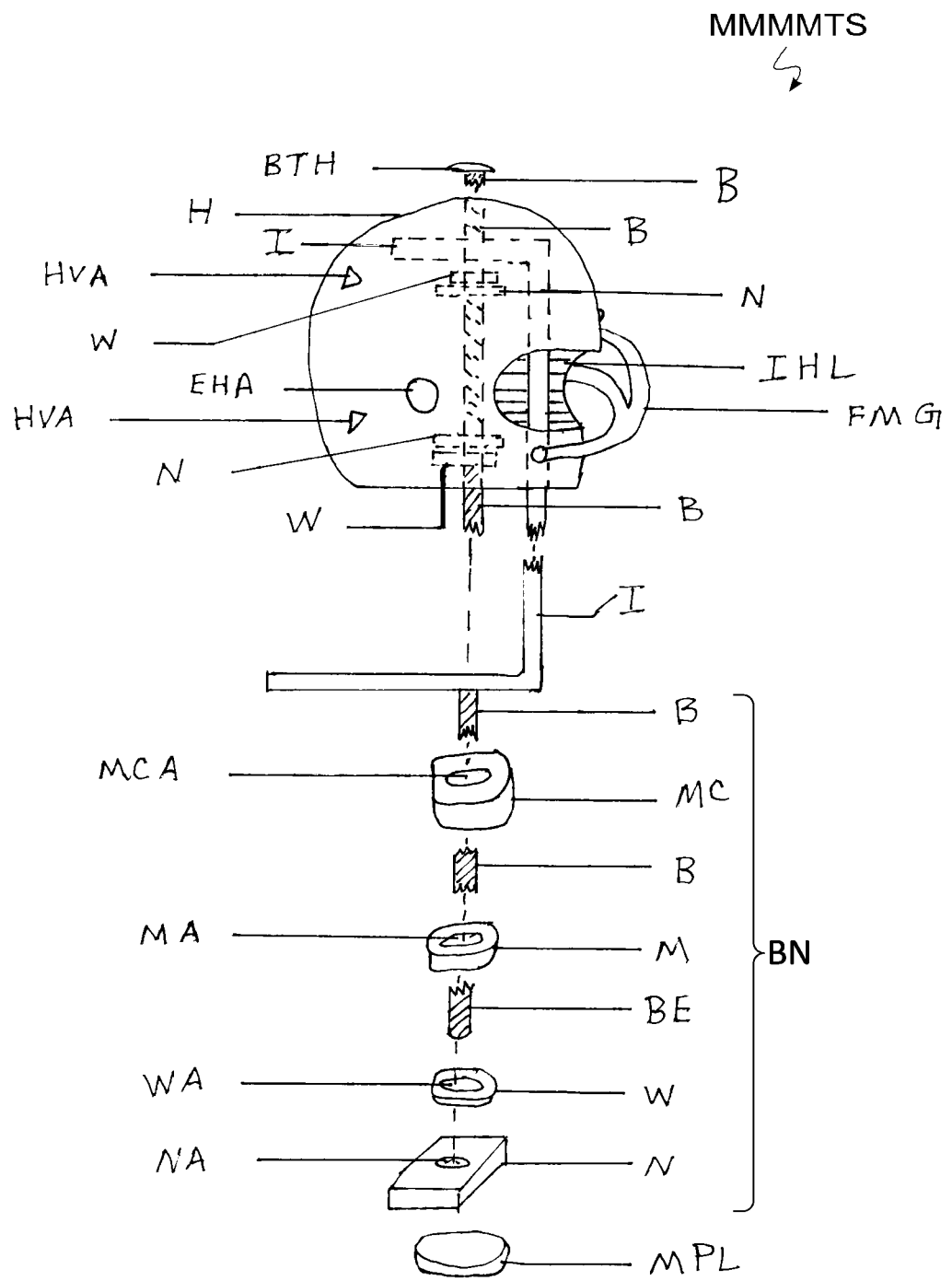
FIG. 1, is a side angle view of present invention featuring, several of its aspects such as with a football helmet with its vertical bolt passing through it, its nuts/washers, bolt sets, its Magnet and its cover and its Magnet protective layer shield.

FIG. 1, is a side angle view of present invention, the Magnetized Multiple Media Memorabilia/Tool Stand MMMMTS apparatus assembly device mechanism featuring its bolt top head BTH through a Memorabilia football helmet H (showing optional inside helmet lining IHL) with its threaded bolt B passing through it interiorly from the top apex of the helmet H, through an upper aperture section of the Brace/Bracket Stabilization Aperture Bar I, then through a washer W/aperture WA into a nut N (turned left to right), (thus the nut-bolt set BN/), where said nut is turn in an upward manner for tightening purposes against the above washer W, the Brace/Bracket Stabilization Aperture Bar I, with apertures and the interior of the Memorabilia football helmet H followed by another nut N being applied to the bolt B but not tighten and then another washer followed by the bolt B continuing downward and then being inserted into the/a lower section aperture ("_A" notation used to indicate an aperture) of the Brace/Bracket Stabilization aperture Bar I and then being placed on and into and through the magnet cover Aperture MCA, then through the magnet M/the magnet's aperture MA, follow by the bolt end BE being placed through an optional washer W its washer aperture WA, a bolt nut B/Bolt nut aperture NA, and whereas the washer and nut that was not tighten (that is above the brace bracket stabilization aperture bar aperture), is now turned in a downward manner (right to left) against the lower aperture of the brace bracket stabilization aperture bar I and the magnet unit cover and the nut/washer set inside the magnet unit, thus to be tighten against each other, followed by the application of its self-adhesive and smooth magnet protection shield layer MPL that's to be placed on the surface bottom of the magnet unit.

Figure 2:
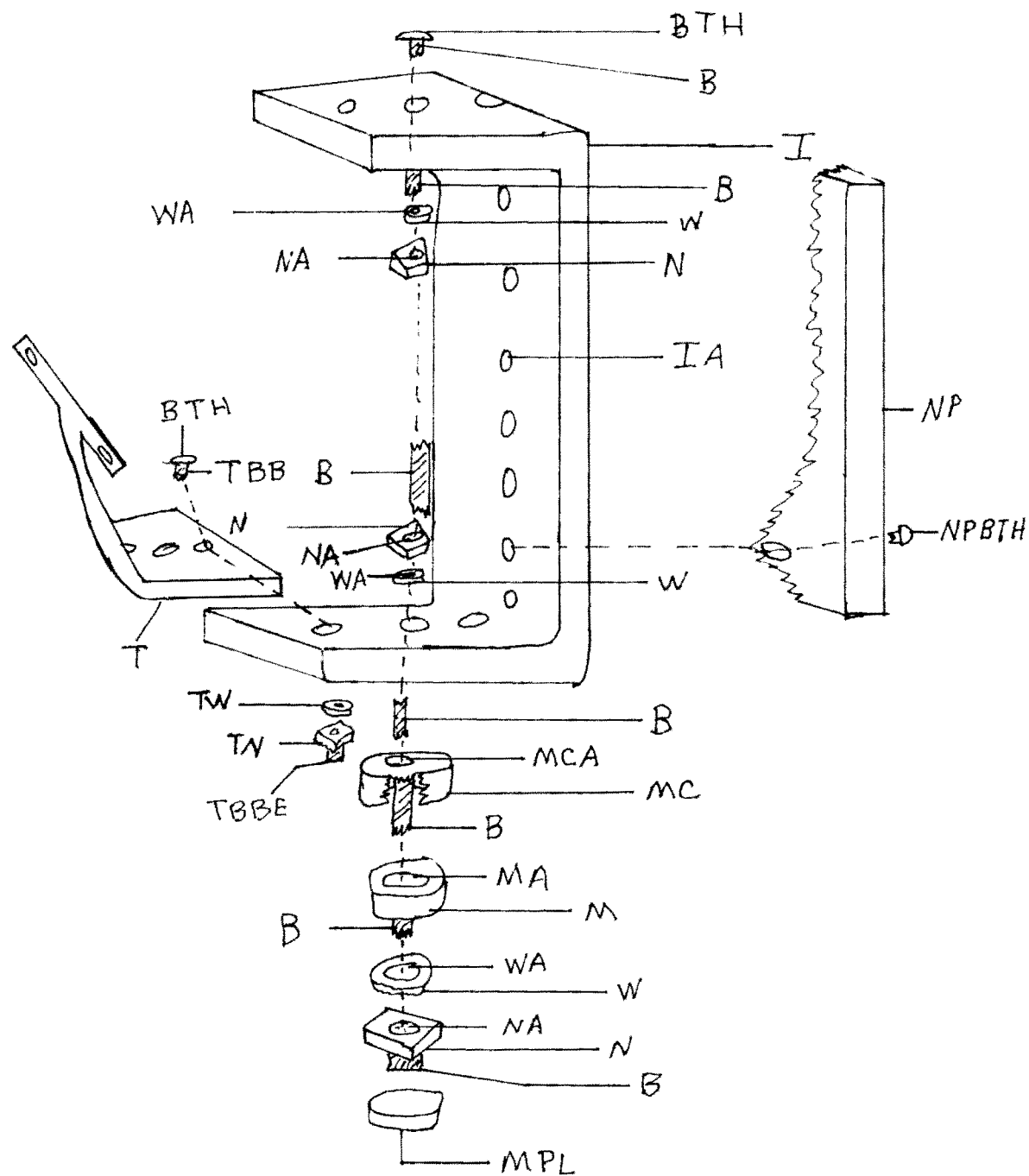
FIG. 2 is a top side angle view of present invention featuring, an enlarged top side angle view of its threaded bolt passing through its brace/bracket stabilization aperture bar, its attachable/detachable "T" embodiments, etc.

FIG. 2 is a top side angle view of the Magnetized Multiple Media Memorabilia/Tool Stand MMMMTS apparatus assembly device mechanism of the present invention, less the Memorabilia, featuring an enlargement of its/the threaded rod/bolt B passing through its brace/bracket stabilization bar I with its apertures IA, its optional attachable/detachable "T" T embodiment is super imposed in its designated position, "T" bar bolt TBB, its "T" bar bolt end TBBE, its "T" nut TN, its "T" washer TW/washer apertures WA, its bolt nut BN/nut aperture NA (sets), its bolt end BE, a cutaway view of its magnet cover MC/magnet M, its magnet smooth protective shield layer MPL, as well as view of a cutaway a name/art work plate NP type represented by broken lines in the shape of a known type of license plate, optionally attachable with, for example, sheet metal-type screw NPBTH.

Figure 3:
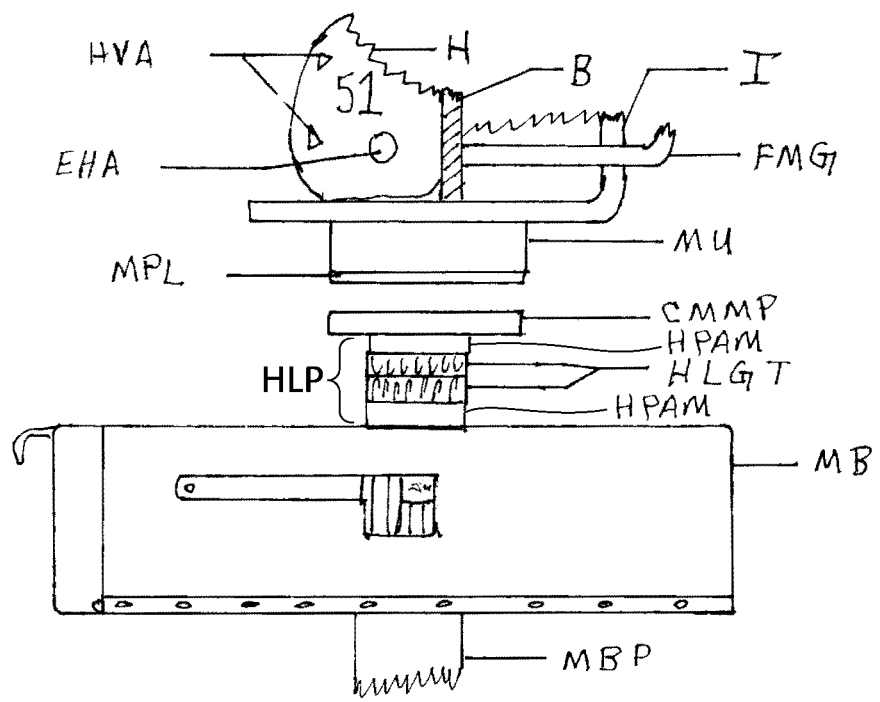
FIG. 3 is a side angle view of present invention featuring, a cutaway side view of a football helmet, its Magnet unit, etc.

FIG. 3 is a cutaway side angle view of the present invention, the Magnetized Multiple Media Memorabilia/Tool Stand MMMMTS apparatus assembly device mechanism featuring it on a Mailbox MB with a view of a cutaway Mailbox Post MBP and a cutaway side view of a Memorabilia football helmet H, which has a helmet vent aperture HVA, helmet ear hole aperture EHA, its brace bracket stabilization aperture bar with apertures I, a cutaway view of the helmet face mask guard FMG, a cutaway view of its stabilization bolt B, its magnet unit MU which includes the magnet cover MC and the magnet M and its smooth magnet protective shield layer MPL, which has its magnetic corresponding metallic plate CMMP that has its hook and loop corresponding pads HLP with their grip tips HLGT embodiment, with their type of peel and stick attachable self-adhesive material HPAM.

Figure 4:
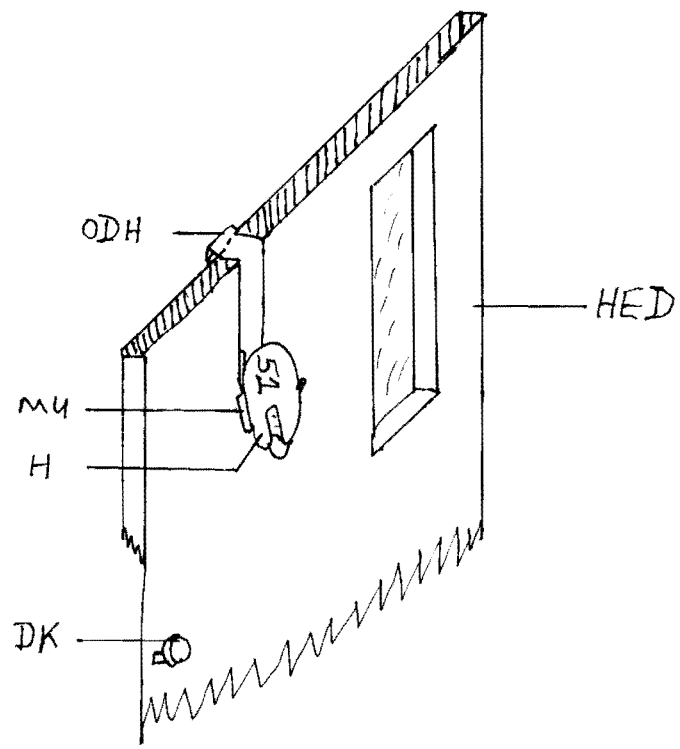
FIG. 4 is a top side angle view of present invention featuring it on a known over the Door Hanger and said having been placed on a Door.

FIG. 4 is a top side angle view of present invention, the Magnetized Multiple Media Memorabilia/Tool Stand MMMMTS, featuring it being displayed by its magnet unit MU and a memorabilia football helmet H on a known over the metal Door Hanger ODH and said has been placed on an entrance/exit door HED in a vertical position, with said the door having a door knob DK and door being in a cutaway view manner.

Figure 5:
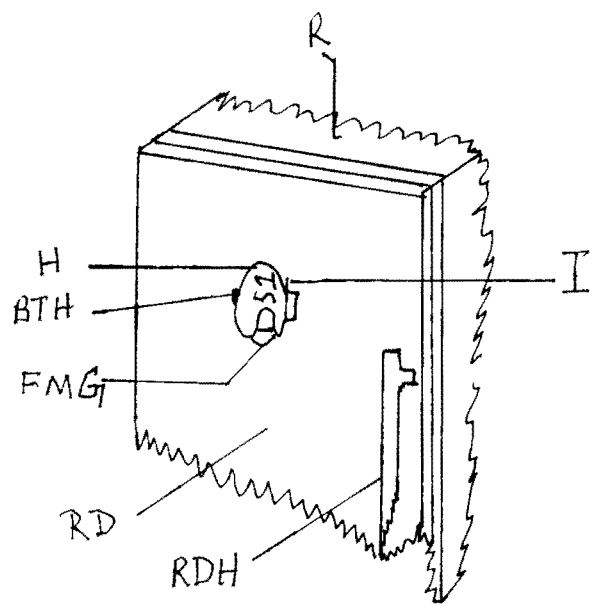

FIG. 5 is a frontal top side angle view of present invention, the Magnetized Multiple Media Memorabilia/Tool Stand MMMMTS, with its memorabilia helmet, featuring it being displayed on a known type of Freezer/Refrigerator R and with said having been placed on the refrigerator door RD, with said highlighting its magnet unit MU in direct contact of/on the refrigerator door RD, with its refrigerator handle RDH, its helmet H, its bolt top head BTH and the helmet face mask guard FMG being viewable.

Figure 6:
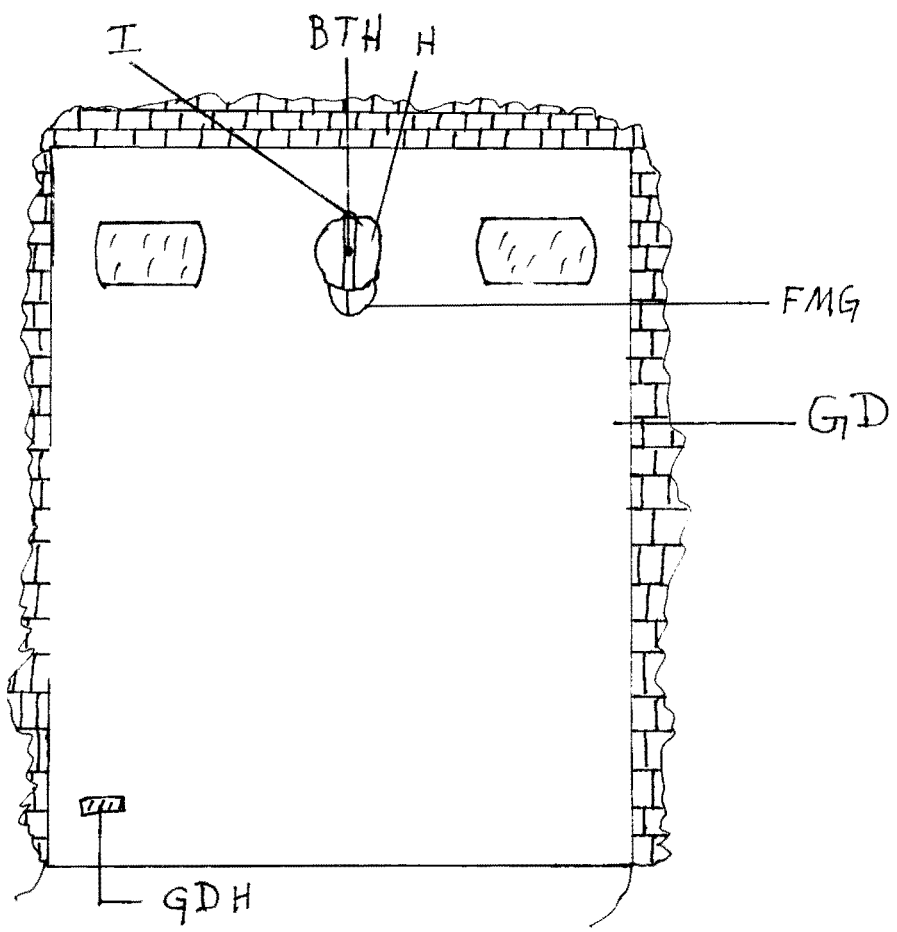
FIG. 6 is a frontal angle view of present invention featuring, it on a known type of Garage Door and said having been placed on a Garage Door and being suspend on the door.

FIG. 6 is a frontal angle view of present invention, the Magnetized Multiple Media Memorabilia/Tool Stand MMMMTS, featuring its Memorabilia helmet H being displayed on a known Garage Door GD, its stabilization bar with apertures I, its face mask guard FMG, while in a vertical position on the/a Garage Door GD. Also shown is the Garage Door Handle GDH, its magnet unit MU and its bolt top head BTH.

Figure 7:
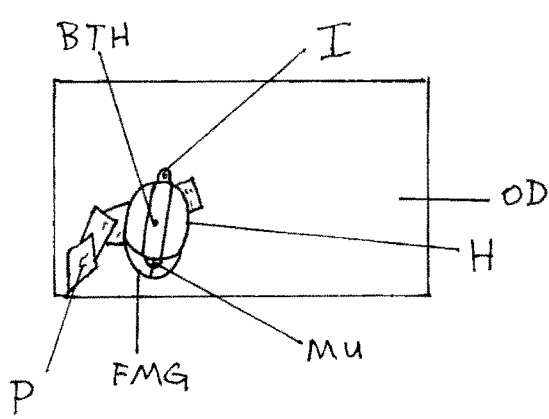
FIG. 7 is a birds-eye view of present invention featuring, it on a known type of Office Desk and said having been placed on the top of the Office Desk horizontally.

FIG. 7 is a birds-eye view of present invention, the Magnetized Multiple Media Memorabilia/Tool Stand MMMMTS, featuring its Memorabilia helmet H being displayed horizontally on a known type of Office Desk OD, while also being used as a paper weight, after having been placed on the top of the Office Desk OD on top of papers P while in a horizontal position. Its face mask guard FMG, its bolt top head BTH and its magnet unit MU is also shown and indicated.

Figure 8:
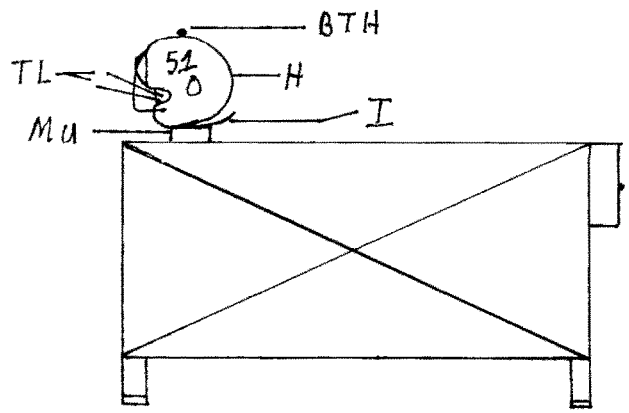
FIG. 8 is a side angle view of present invention featuring it on a Desk with Tools/Implements inserted into Stabilization Bar.

FIG. 8 is a side angle view of present invention, the Magnetized Multiple Media Memorabilia/Tool Stand MMMMTS, with its memorabilia helmet, featuring it being horizontally displayed on an Office Desk OD with Tools/Implements TL inserted (placed in/on) into its stabilization brace bracket Bar with apertures I (Pens, Pencils, Screwdriver, paper clip, etc.)

Figure 9:
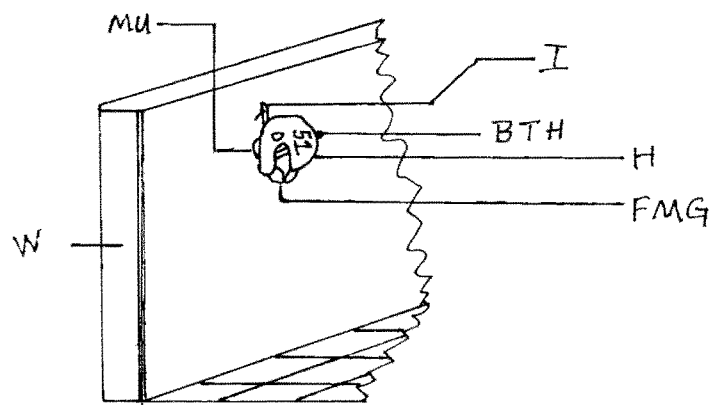
FIG. 9 is a top side angle view of present invention, the Magnetized Multiple Media Memorabilia/Tool Stand, featuring it being displayed on a wall in a cutaway wall and floor view.

FIG. 9 is a top side angle view of present invention, the Magnetized Multiple Media Memorabilia/Tool Stand MMMMTS, featuring it being displayed on a wall W in a cutaway wall and floor view and its memorabilia helmet H, in a vertical manner through the use of that which is used to hang a picture or other standard wall hung item(s)/ornaments.

Figure 10:
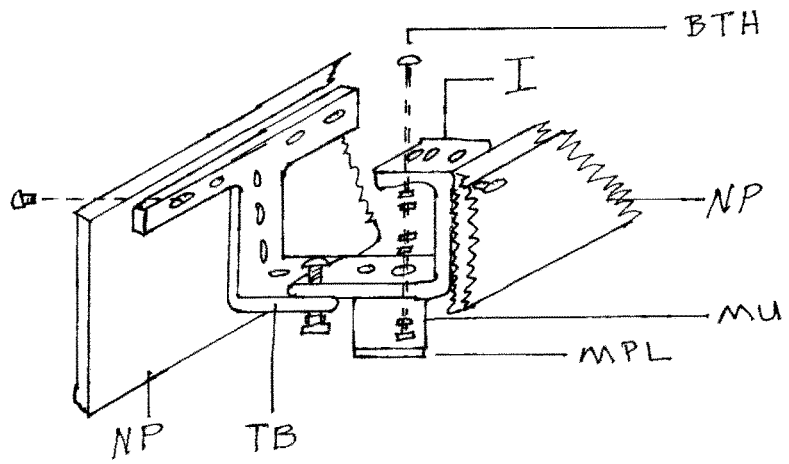
FIG. 10 is a side angle view of present invention, the Magnetized Multiple Media Memorabilia/Tool Stand, featuring it being displayed with two (2) personal preferred items.

FIG. 10 is a side angle view of present invention, the Magnetized Multiple Media Memorabilia/Tool Stand MMMMTS, featuring it being displayed with two (2) personal items and affects simultaneously with and through its "T" bar embodiment T and stated herein embodiments needed.

The foregoing embodiments of the present invention, the Magnetized Multiple Media Memorabilia/Tool Stand MMMMTS, has been presented for purposes of illustration and description. They are not intended to be exhaustive or to limit the invention and its method/means of use to the precise forms disclosed herein and it can be appreciated by one skilled in the art that other styles configurations and modifications of the present invention can be incorporated into the teachings of the present inventions disclosure upon reading the specifications and that the embodiments shown and described herein are for the purposes of clarity and disclosure and not to limit the scope. The herein embodiments have been chosen and described in order to best explain the principles and practical application in accordance with the invention to enable those skilled in the art to best utilize the various embodiments with expected modifications as are sited to the particular use(s) contemplated. The present application includes such modifications and is not limited only by the scope of the claims of/for the present invention herein.

What is claimed is:

1. A magnetized multiple media memorabilia and tool stand, said stand comprising:
   a vertical rod member;
   a base member perpendicular thereto, said base member being magnetized and having a cover where the base member and its cover have apertures so as to allow said vertical rod member to pass through them, being secured to it; and a geometric stabilization bar member which has apertures allowing the vertical rod to be attached thereto thereby forming a stabilization bar which allows a memorabilia to be mounted thereto and further effect an implement holder;

wherein said stand is attachably detachable to surfaces.

2. The stand of claim 1, said wherein the geometric stabilization bar the base member and its cover are joined together through their respective apertures by way of said vertical rod member.

3. The stand of claim 1 wherein nuts, washers, bolts, screws, and/or adhesive material join elements thereof.

4. The stand of claim 1, wherein said vertical rod member has two opposite ends at which one said opposite end of ends has capabilities of accepting connection elements for stabilization purposes of the stand.

5. The stand of claim 1, wherein said base member has a protective layered non-abrasive material to assist in scratch damage control when placed on desired locations.

6. The stand of claim 1, wherein said base member has a corresponding metallic plate for adhering adhesive hook and loop materials to non-metallic surfaces.

7. The stand of claim 1, wherein said geometric stabilization bar has apertures for aerodynamics purposes, stabilization, mounting, display aspects, and tool functionality usage.

8. The stand of claim 1, wherein said geometric bar has apertures allowing its exposed lower outward end a capability for suspending the stand or accepting a "T" bar implement or is curved in an upward direction perpendicular to the base.

9. The stand of claim 1 further comprising an end user's choice of a Memorabilia item.

10. The stand of claim 1, further comprising a mounting surface for one or more name plates and/or artwork.

11. The stand of claim 1, wherein the rod member passes through said apertures in a vertical manner of ninety degrees is secured with nuts and washer or adhesive material.

12. The stand of claim 1, wherein the base member and its cover have a smooth protective layer shield thereon that is adhesively attached thereto for surface protection.

13. The stand of claim 1, wherein the stand has an attachable/detachable magnet unit corresponding metal plate that adheres to the base member when an end user desires and a corresponding metal plate has an adhesive hook/loop material combination pad embodiments which are capable of adhering to ferrous/non-ferrous material.

14. The stand of claim 1, wherein the base member is capable of withstanding at least 95 pounds(lbs.) of pull.

15. The stand of claim 1, wherein the rod member is a threaded bolt having a head end and a threaded end, wherein the head end is disposed at a top of the memorabilia, wherein assembly of the stand comprises passing the threaded end through the top of the memorabilia then through an upper section of the geometric stabilization bar aperture, then fastening a known fastener set and tightening upward toward the head end against the upper section of the geometric stabilization bar aperture and an inner side of said memorabilia, then applying a second fastener set to the bolt and tightening downward against the geometric stabilizing aperture and then passing the bolt through a lower section of said geometric stabilizing bar aperture and then placing said geometric stabilizing bar on a top of said base member cover then passing said bolt through an aperture of said base member cover, then through said base member then through a magnet element of said base member in a recessed space thereof.

16. The stand of claim 1, wherein two or more elements of expression or artwork are affixed thereto unitarily and simultaneously.

17. The stand of claim 1, wherein the vertical rod can pass through the memorabilia and have other items attached simultaneously to it while it is attached to the base member.

18. The stand of claim 1, configured to accommodate one or more memorabilia selected from the group consisting of thermos or water bottles, cups, baseball caps, and trophies.

19. The stand of claim 1, wherein a "T" Bar element has bolts, nuts, and washer sets for accessory attachment to the geometric stabilization bar.

* * * * *